(12) United States Patent
Takeshita et al.

(10) Patent No.: US 6,951,678 B2
(45) Date of Patent: Oct. 4, 2005

(54) MOUTH GUARD-PREPARING SHEET

(75) Inventors: Takaharu Takeshita, Tokyo (JP); Hiroshi Kamohara, Tokyo (JP)

(73) Assignee: GC Corporation, Tokyo (JP)

( * ) Notice: Subject to any disclaimer, the term of this patent is extended or adjusted under 35 U.S.C. 154(b) by 0 days.

(21) Appl. No.: 10/202,652

(22) Filed: Jul. 25, 2002

(65) Prior Publication Data

US 2003/0021939 A1 Jan. 30, 2003

(51) Int. Cl.$^7$ ............................................... B32B 3/02
(52) U.S. Cl. ..................... 428/64.1; 428/60; 428/64.9; 428/156; 128/857; 128/861; 128/862
(58) Field of Search ................................ 128/857, 861, 128/862; 428/64.1, 64.9, 60, 156, 64

(56) References Cited

U.S. PATENT DOCUMENTS

| | | |
|---|---|---|
| 3,307,222 A | 3/1967 | Baldwin et al. |
| 3,528,132 A | 9/1970 | Greenberg et al. |
| 4,920,984 A * | 5/1990 | Furumichi et al. .......... 128/861 |
| 5,829,980 A | 11/1998 | Sheridan et al. |

FOREIGN PATENT DOCUMENTS

| | | |
|---|---|---|
| DE | 195 11 064 | 9/1996 |
| EP | 0 265 771 | 5/1988 |

* cited by examiner

*Primary Examiner*—Patrick Joseph Ryan
*Assistant Examiner*—Jane Rhee
(74) *Attorney, Agent, or Firm*—Oblon, Spivak, McClelland, Maier & Neustadt, P.C.

(57) ABSTRACT

To provide a mouth guard-preparing sheet from which a mouth guard to be used for preventing teeth and their surrounding tissues from a trauma occurred mainly in sports and having a uniform thickness between the right and left sides thereof can be prepared, without causing a problem in the thickness of an anterior teeth portion becoming thin in the preparation of a custom-made mouth guard by heat-sucking. The mouth guard-preparing sheet is made of a thermoplastic resin having a plane shape substantially coincident with a shape of a fixed frame of a heat-sucking type mouth preparation device and provided with a mouth guard portion from a site to be contacted with a labial surface side of a gingiva of an anterior teeth portion to a molar portion side and an elongation tab portion in an exterior direction of a mouth guard portion, wherein said mouth guard portion has a thickness of 1.5~10 mm; said elongation tab portion has a thickness of 0.1~0.95 times the thickness of said mouth guard portion; and a stepped portion between the mouth guard portion and the elongation tap portion is in a straight line.

4 Claims, 2 Drawing Sheets

MOUTH GUARD-PREPARING SHEET

BACKGROUND OF THE INVENTION

1. Field of the Invention

The present invention relates to a mouth guard-preparing sheet for the preparation of a mouth guard to be used for preventing teeth and their surrounding tissues from a trauma occurred mainly in sports.

2. Description of the Related Art

A large external force is often applied to teeth or a maxillary bone during the game of hard physical contact sports including boxing, rugby football and American football as well as soccer and karate. In order to confine a trauma on teeth and their surrounding tissues occurred at that time to the minimum and to protect a stomatognathic system, it is generally carried out to set an elastic material made of, for example, rubber, which is called a mouth guard or mouth protector, in an oral cavity.

As the mouth guard, a so-called "custom-made" mouth guard that a dentist makes according to the shape of an oral cavity of an individual for whom the mouth guard is set has become widespread. In the preparation of the so-called "custom-made" mouth guard, a mouth guard composition comprising a sheet-like polyolefin-based rubber material or thermoplastic resin (elastomer) such as an ethylene-vinyl acetate copolymer is used and formed using a heat-sucking type mouth guard preparation device provided with a heater and a sucking unit as shown in FIG. 4. In other words, a mouth guard-preparing sheet 1 provided in a sheet-like form is fixed within an exclusive fixed frame 2 coincident with the shape of the mouth guard-preparing sheet 1, heated and softened in 100~150° C. for 2~5 minutes by means of a heater 3 of 400 to 700 W generally provided in an upper portion, and pressed on a previously prepared gypsum cast 4 wherein a dentition and a gingiva in an oral cavity are reproduced, which is placed within a vacuum table 5 having many sucking openings 5a provided therein; and air between the mouth guard-preparing sheet 1 and the gypsum cast 4 is then sucked, thereby forming the mouth guard-preparing sheet 1 so as to coincide with the gypsum cast 4. There is thus prepared a mouth guard.

However, there was involved a problem that in preparing the mouth guard using the mouth guard-preparing sheet 1 in the above-describe method, an anterior teeth portion of the mouth guard after the formation becomes thin as shown in FIG. 5 that is a cross-sectional explanatory view. This is because in forming the heated mouth guard-preparing sheet 1 so as to coincide with the gypsum cast 4 while sucking, the mouth guard-preparing sheet 1 is elongated most in the anterior teeth portion which is the highest site on the gypsum cast 4, and as a result, the mouth guard in the anterior teeth portion becomes thin. The fact that the mouth guard in the anterior teeth portion becomes thin makes not only a problem of occurrence of tearing off of the mouth guard on the occlusion surface but also a decrease in the impact absorption capacity, which is caused by thickness on the occlusion surface becoming thin, as compared with that as originally designed. Accordingly, the resulting mouth guard cannot exhibit a sufficient effect.

In order to overcome the problem that the anterior teeth portion becomes thin, among conventional mouth guard-preparing sheets, there have been those which took an approach to make thick only the horseshoe-shaped portion corresponding to a dental arch portion. However, in these conventional mouth guard-preparing sheets, the dental arch portion is not always positioned at the center portion of the horseshoe-shaped portion, whose thickness is made thick, depending on the size of the gypsum cast and the shape of a jaw of an individual. For this reason, a mouth guard having a different thickness between the right and left sides thereof is likely formed. As a result, there was a problem that it takes a considerably long period of time to modify the formed mouth guard.

SUMMARY OF THE INVENTION

An object of the present invention is to overcome the above-described problems and to provide a mouth guard-preparing sheet with which a mouth guard having a uniform thickness on the right and left sides thereof can be prepared, without causing a problem in the thickness of an anterior teeth portion becoming thin during the preparation of a custom-made mouth guard by heat-sucking.

The present inventors have made extensive and intensive investigations to achieve the above-described object. As a result, it has been found that in a mouth guard-preparing sheet made of a thermoplastic resin having a plane shape substantially coincident with a shape of a fixed frame of a heat-sucking type mouth guard preparation device, when a thin elongation tab portion preferentially elongating from a site to be contacted with a labial surface side of a gingiva of an anterior teeth portion in the external direction of a mouth guard portion of a molar portion side is provided, the mouth guard portion is free from is excessive elongation and becoming thin; and that when a stepped portion between the mouth guard portion and the elongation tab portion is in a straight line, no difference in thickness between the right and left sides of the prepared mouth guard is present, leading to accomplishment of the present invention.

Specifically, the mouth guard-preparing sheet according to the present invention is made of a thermoplastic resin having a plane shape substantially coincident with a shape of a fixed frame of a heat-sucking type mouth preparation device and provided with a mouth guard portion from a site to be contacted with a labial surface side of a gingiva of an anterior teeth portion to a molar portion side, an elongation tab portion in an external direction of a mouth guard portion, wherein the mouth guard portion has a thickness of 1.5~10 mm; the elongation tab portion has a thickness of 0.1~0.95 times the thickness of the mouth guard portion; and a stepped portion between the mouth guard portion and the elongation tap portion is in a straight line. Preferably, the plane shape is a substantial quadrate having a side of 8~15 cm, wherein a shortest distance from the straight line in the stepped portion to an edge of the elongation tap portion perpendicular thereto is $1/25 \sim 1/2$ of a long side of the quadrate; and the plane shape is a substantial circle having a diameter of 7~20 cm, wherein a longest distance from the straight line of the stepped portion to an edge of the elongation tap portion perpendicular thereto is $1/25 \sim 1/2$ of the diameter of the circle.

DESCRIPTION OF THE PREFERRED EMBODIMENTS

Figure 1:
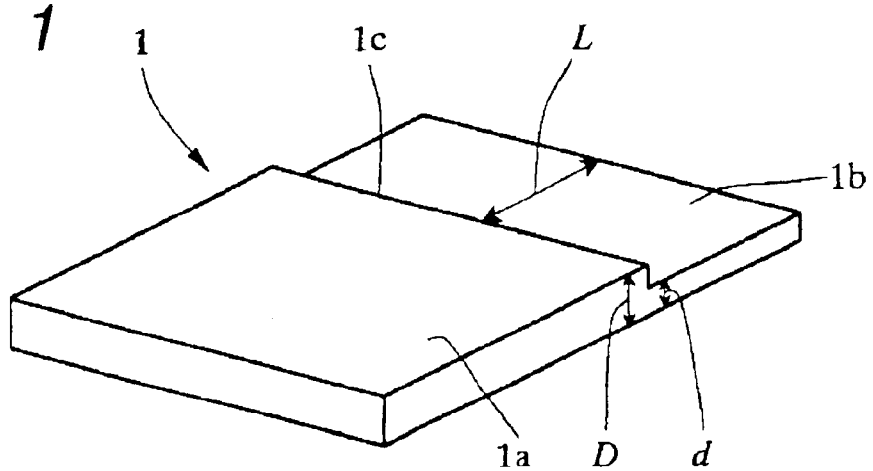
FIG. 1 is a perspective view to show one example of a mouth guard-preparing sheet according to the present invention.

The mouth guard-preparing sheet according to the present invention will be described below in detail with reference to the accompanying drawings.

A mouth guard-preparing sheet 1 according to the present invention has a plane shape which has a substantial quadrate such as a square and a rectangle, or a substantial circle, which is substantially coincident with a shape of a fixed frame 2 of a heat-sucking type mouth preparation device, and is made of a conventionally-employed polyolefin-based rubber material or thermoplastic resin (elastomer) such as an ethylene-vinyl acetate copolymer. The mouth guard-preparing sheet 1 according to the present invention is provided with a mouth guard portion 1a from a site to be contacted with a labial surface side of a gingival of an anterior teeth portion to a molar portion side and an elongation tab portion 1b preferentially elongating by sucking as compared with the mouth guard portion 1a, wherein the mouth guard portion 1a has a thickness D of 1.5~10 mm; and the elongation tab portion 1b has a thickness d of 0.1~0.95 times the thickness D of the mouth guard portion 1a. As a result, it becomes possible to ensure a desired thickness without causing the mouth guard portion 1a to be elongated in an excessively thin state.

The reason why the thickness D of the mouth guard portion 1a of the molar side from the site to be contacted with the labial surface side of the gingiva of the anterior teeth portion must be 1.5~10 mm is as follows. That is, when the thickness D of the mouth guard portion 1a is less than 1.5 mm, a thickness required for the mouth guard cannot be obtained, whereas when it exceeds 10 mm, the formation becomes difficult. Also, the reason why the thickness d of the elongation tab portion 1b preferentially elongating in an external direction of the mouth guard portion 1a by sucking as compared with the elongation tab portion 1b is 0.1~0.95 times the thickness D of the mouth guard portion 1a is as follows. That is, when the thickness d of the elongation tab portion 1b is less than 0.1 time the thickness D of the mouth guard portion 1a, the elongation tab portion 1b is elongated so fast that a breakage is likely to occur between the elongation tab portion 1b and the mouth guard portion 1a, or the elongation tab portion 1b is not formed along the surrounding of the gingiva of the anterior teeth portion, resulting in worsening the fitness, whereas when it exceeds 0.95 times the thickness D of the mouth guard portion 1a, a difference in the thickness between the elongation tab portion 1b and the mouth guard portion 1a is so small that the elongation tab portion 1b is not effectively elongated, whereby its effect cannot be obtained.

Figure 3:
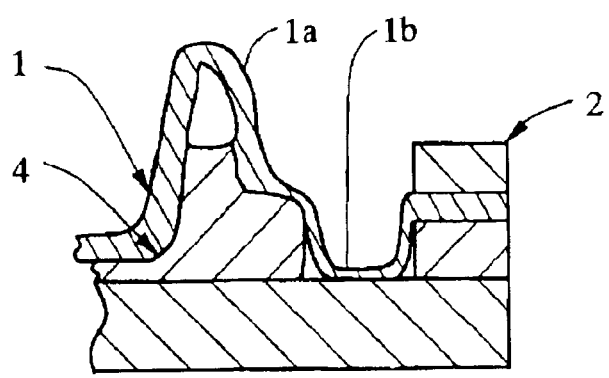
FIG. 3 is a cross-sectional explanatory view to show a cross-section of an anterior teeth portion of a mouth guard formed using a mouth guard-preparing sheet according to the present invention.
Figure 4:
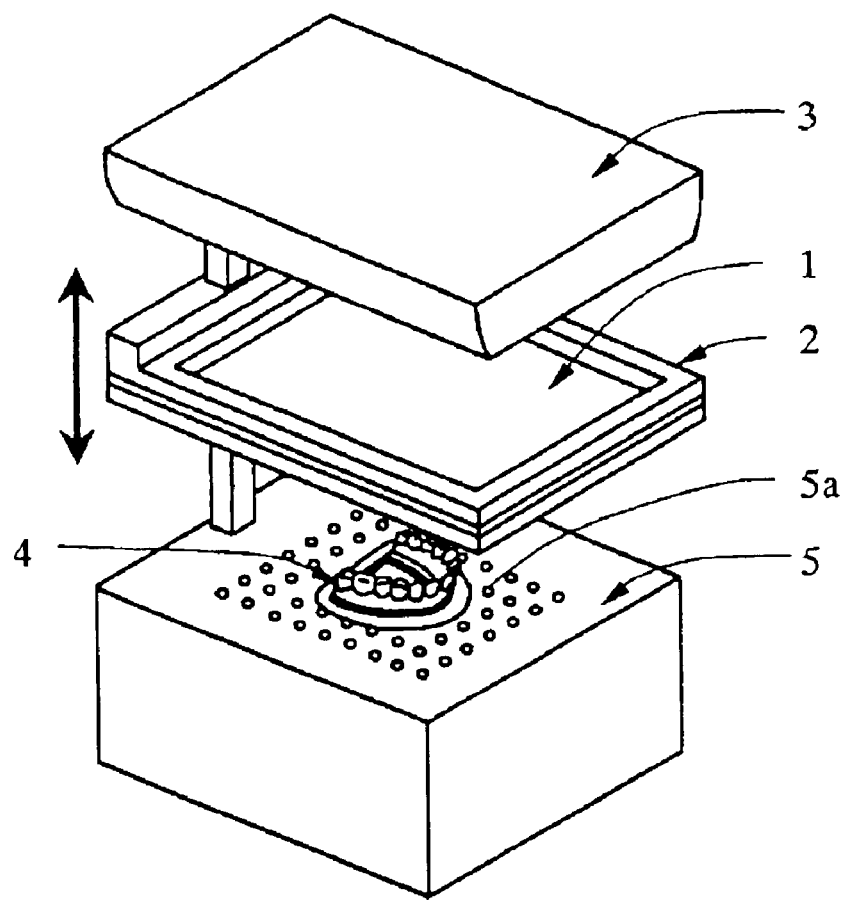
FIG. 4 is an explanatory perspective view to show a structure of a mouth guard preparation device.
Figure 5:
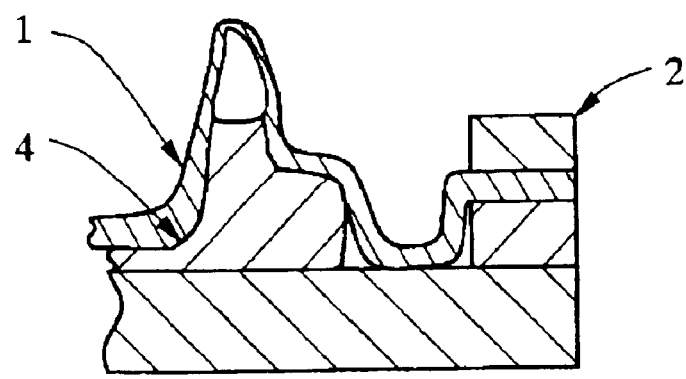
FIG. 5 is a cross-sectional explanatory view to show a cross-section of an anterior teeth portion of a mouth guard formed using a conventional mouth guard-preparing sheet.

It is important that a stepped portion 1c between the mouth guard portion 1a and the elongation tab portion 1b is made in a straight line. When the stepped portion 1c is made in a straight line, during the formation of the mouth guard, the anterior teeth portion of a gypsum cast 4 is positioned at a position where the anterior teeth portion thereof comes into the mouth guard portion 1a from the stepped portion 1c by a length equal to or slightly longer than the length of the labial surface side of the gingiva of the anterior teeth portion of the gypsum cast 4, and the mouth guard-preparing sheet 1 is positioned such that a line perpendicular to the straight line forming the stepped portion 1c is substantially coincident with a median line of the gypsum cast 4. In such configuration, not only a mouth guard thus prepared is free from a difference in the thickness between the right and left sides thereof, but also since the elongation tab portion 1b is preferentially elongated, a high portion in the mouth guard portion 1a, such as the anterior teeth portion, is not excessively elongated. Accordingly, the thickness of the anterior teeth portion of the prepared mouth guard does not become thin as shown in FIG. 3.

Figure 2:
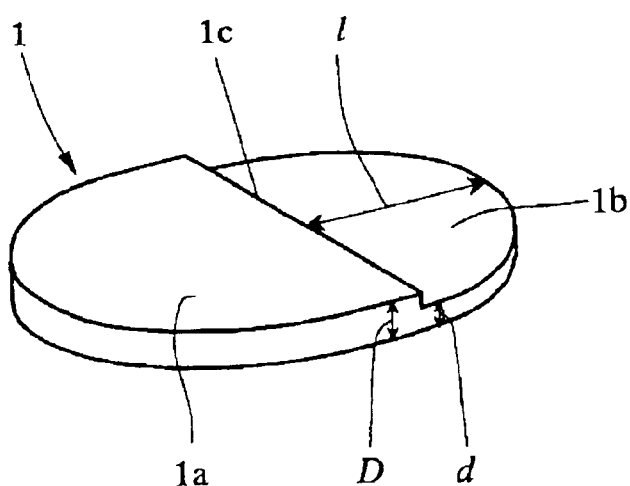
FIG. 2 is a perspective view to show another example of a mouth guard-preparing sheet according to the present invention.

As typical examples of the mouth guard-preparing sheet 1 having such structure, the case as shown in FIG. 1, in which the plane shape is a substantial quadrate having a side of 8~15 cm, and a shortest distance L from the straight line in the stepped portion 1c to an edge of the elongation tap portion 1b perpendicular thereto is ½₅~½, or, in order to obtain the better effect of the elongation tab portion 1b, ⅙~⅓ of a long side of the quadrate; and the case as shown in FIG. 2, in which the plane shape is a substantial circle having a diameter of 7~20 cm, and a longest distance l from the straight line in the stepped portion 1c to an edge of the elongation tap portion 1b perpendicular thereto is ½₅~½, or, in order to further obtain better effects of the elongation tab portion 1b, ⅙~⅓ of the diameter of the circle can be shown. This is because when the distance L is less than ½₅ of the long side of the quadrate, or the distance l is less than ½₅ of the diameter of the circle, the elongation tab portion 1b is too small to obtain effects: and when the distance L exceeds ½ of the long side of the quadrate, or the distance l exceeds ½ of the diameter of the circle, the elongation tab portion 1b is too large for the elongation tab portion 1b to be formed along the surrounding of the gingiva of the anterior teeth portion, resulting possibly in worsening the fitness.

As described above in detail, the mouth guard-preparing sheet according to the present invention is a mouth guard-preparing sheet from which a mouth guard having a uniform thickness between the right and left sides thereof can be prepared, without causing a problem of the thickness of an anterior teeth portion becoming thin during the preparation of a custom-made mouth guard by heat-sucking. Accordingly, the present invention is greatly valuable in contributing to the dental treatment.

While the present invention has been described in detail and with reference to specific embodiments thereof, it will be apparent to one skilled in the art that various changes and modifications can be made therein without departing from the spirit and scope thereof.

What is claimed is:

1. A mouth guard-preparing sheet for use with a heating and suction device for forming the sheet into a mouth guard, said mouth guard-preparing sheet comprising a thermoplastic resin having a plane shape adapted to be substantially coincident with a shape of a fixed frame of the heating and suction device, said mouth guard-preparing sheet is provided with a mouth guard portion pressed on a previously prepared gypsum cast wherein a dentition and gingival in an oral cavity are reproduced, and an elongation tab portion in an external direction of an anterior side of said mouth guard portion, wherein said mouth guard portion has a uniform thickness of from 1.5 to 10 mm; said elongation tab portion which does not compose the mouth guard has a thickness of 0.1~0.95 times the thickness of said mouth guard portion; and a stepped portion between the mouth guard portion and the elongation tab portion is in a straight line.

2. The mouth guard-preparing sheet according to claim 1, wherein said plane shape is of a substantial quadrate having a side of 8~15 cm, and a shortest distance from the straight line of said stepped portion to an edge of said elongation tab portion perpendicular thereto is $\frac{1}{25}$~$\frac{1}{2}$ of a long side of said quadrate.

3. The mouth guard-preparing sheet according to claim 1, wherein said plane shape is of substantial circle having a diameter of 7~20 cm, and a longest distance from the straight line of said stepped portion to an edge of said elongation tab portion perpendicular thereto is $\frac{1}{25}$~$\frac{1}{2}$ of the diameter of said circle.

4. A mouth guard-preparing sheet comprising:

a thermoplastic resin having a generally planar shape, said thermoplastic resin having a mouth guard portion, an elongation tab portion, and a stepped portion connecting said mouth guard portion to said elongation tab portion, wherein:

said mouth guard portion is pressed on a previously prepared gypsum cast wherein a dentition and gingival in an oral cavity are reproduced, and said elongation tab portion is provided in an external direction of an anterior side of said mouth guard portion, said mouth guard portion has a uniform thickness of from 1.5 to 10 mm, said elongation tab portion which does not compose the mouth guard portion has a thickness of 0.1~0.95 times the thickness of said mouth guard portion, and said stepped portion is linear.

* * * * *

UNITED STATES PATENT AND TRADEMARK OFFICE
CERTIFICATE OF CORRECTION

PATENT NO. : 6,951,678 B2
DATED : October 4, 2005
INVENTOR(S) : Takaharu Takeshita et al.

It is certified that error appears in the above-identified patent and that said Letters Patent is hereby corrected as shown below:

<u>Title page,</u>
Item [30], Foreign Application Priority Data, should read:
-- Jul. 27, 2002 (JP)       2001-004938 --.

Signed and Sealed this

Seventh Day of February, 2006

JON W. DUDAS
*Director of the United States Patent and Trademark Office*